US010088309B2

(12) United States Patent
Moeglein et al.

(10) Patent No.: US 10,088,309 B2
(45) Date of Patent: Oct. 2, 2018

(54) LAN-BASED BAROMETRIC ALTIMETRY

(71) Applicant: QUALCOMM Incorporated, San Diego, CA (US)

(72) Inventors: Mark L. Moeglein, Ashland, OR (US); Ju-Yong Do, Palo Alto, CA (US); Guttorm R. Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 746 days.

(21) Appl. No.: 14/280,332

(22) Filed: May 16, 2014

(65) Prior Publication Data

US 2015/0330779 A1   Nov. 19, 2015

(51) Int. Cl.
G01C 5/06 (2006.01)
G01C 25/00 (2006.01)
G01C 21/20 (2006.01)
H04W 4/04 (2009.01)

(52) U.S. Cl.
CPC .............. G01C 5/06 (2013.01); G01C 25/00 (2013.01); G01C 21/206 (2013.01); H04W 4/04 (2013.01)

(58) Field of Classification Search
CPC ........ G01C 5/06; G01C 25/00; G01C 21/206; H04W 4/04
USPC ........................................................ 342/462
See application file for complete search history.

(56) References Cited

U.S. PATENT DOCUMENTS

2009/0061892 A1   3/2009 Lee et al.
2011/0199257 A1   8/2011 Lundgren et al.
2012/0072110 A1   3/2012 Venkatraman

FOREIGN PATENT DOCUMENTS

| EP | 1166142 A1 | 1/2002 |
|---|---|---|
| EP | 2511657 A1 | 10/2012 |
| WO | WO-2012052766 A2 | 4/2012 |
| WO | WO-2013101005 A1 | 7/2013 |
| WO | WO-2013108043 A2 | 7/2013 |
| WO | WO-2014202111 A1 | 12/2014 |

OTHER PUBLICATIONS

Wikipedia article, "Average", Jul. 18, 2017.*
International Search Report and Written Opinion—PCT/US2015/025564—ISA/EPO—dated Jul. 6, 2015.

* cited by examiner

Primary Examiner — Frank J McGue
(74) Attorney, Agent, or Firm — Kilpatrick Townsend & Stockton, LLP

(57) ABSTRACT

Methods and systems are presented for providing a combined barometric value. In some embodiments, the method includes obtaining, at the serving fixed local transceiver, barometric values of a plurality of client fixed local transceivers, and determining a combined barometric correction value. The method further includes initiating a barometric correction value of the serving fixed local transceiver to the combined barometric correction value, and sending an indication of the barometric correction value to the plurality of client fixed local transceivers. The method further includes receiving a request for the serving fixed local transceiver barometric correction value from a target client fixed local transceiver, and sending the barometric correction value from the serving fixed local transceiver to the target client fixed local transceiver.

18 Claims, 10 Drawing Sheets

LAN-BASED BAROMETRIC ALTIMETRY

FIELD

The present disclosures generally relate to determining barometric values in an indoor navigation system.

BACKGROUND

Efforts to utilize fixed local transceivers (FLTs) in position location determinations, such as in indoor positioning, may be improved by incorporating barometric readings of FLTs, assuming the FLTs possess such capability. For example, the barometric readings from the FLTs may be used to facilitate, supplement, or corroborate what floor of a building a FLT is located on, which in turn may be used to determine what floor a mobile device accessing said FLT is located on. However, problems may arise when trying to rely on unreliable raw barometric readings from a FLT. For example, if a mobile device utilizes unreliable raw barometric readings from a FLT, the mobile device may miscalculate the floor upon which the FLT is located, and may provide an inaccurate position determination based on the miscalculated location of the FLT.

Thus, efforts to improve accuracy and reliability of positioning techniques using barometric readings of FLTs (e.g., for indoor positioning purposes, assistance data, etc.), are desirable.

BRIEF SUMMARY

In some embodiments, a method of providing a combined barometric value by a serving fixed local transceiver is presented. The method may include obtaining, at the serving fixed local transceiver, barometric values of a plurality of client fixed local transceivers, and determining a combined barometric correction value. The method further includes initiating a barometric correction value of the serving fixed local transceiver to the combined barometric correction value, and sending an indication of the barometric correction value to the plurality of client fixed local transceivers. The method further includes receiving a request for the serving fixed local transceiver barometric correction value from a target client fixed local transceiver, and sending the barometric correction value from the serving fixed local transceiver to the target client fixed local transceiver.

In some embodiments, a serving fixed local transceiver for providing a combined barometric value is presented. The serving fixed local transceiver may include a processor configured to obtain barometric values of a plurality of client fixed local transceivers, determine a combined barometric correction value, and initiate a barometric correction value of the serving fixed local transceiver to the combined barometric correction value. The serving fixed local transceiver may further include a transmitter configured to send an indication of the barometric correction value to the plurality of client fixed local transceivers. The serving fixed local transceiver may further include a receiver configured to receive a request for the serving fixed local transceiver barometric correction value from a target client fixed local transceiver. The transmitter may be further configured to send the barometric correction value from the serving fixed local transceiver to the target client fixed local transceiver.

In some embodiments, a method of correcting a barometric value by a client fixed local transceiver is presented. The method may include measuring, at the client fixed local transceiver, the barometric value and sending the measured barometric value to a serving fixed local transceiver. The method may further receiving a combined barometric value, wherein the combined barometric value is comprised of a combination of barometric values from a plurality of client fixed local transceivers. The method may further include determining a corrected barometric value based on the combined barometric value.

In some embodiments, a client fixed local transceiver for correcting a barometric value is presented. The client fixed local transceiver may include a barometer configured to measure the barometric value and a transmitter configured to send the measured barometric value to a serving fixed local transceiver. The client fixed local transceiver may further include a receiver configured to receive a combined barometric value, wherein the combined barometric value is comprised of a combination of barometric values from a plurality of client fixed local transceivers. The client fixed local transceiver may further include a processor configured to determine a corrected barometric value based on the combined barometric value.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
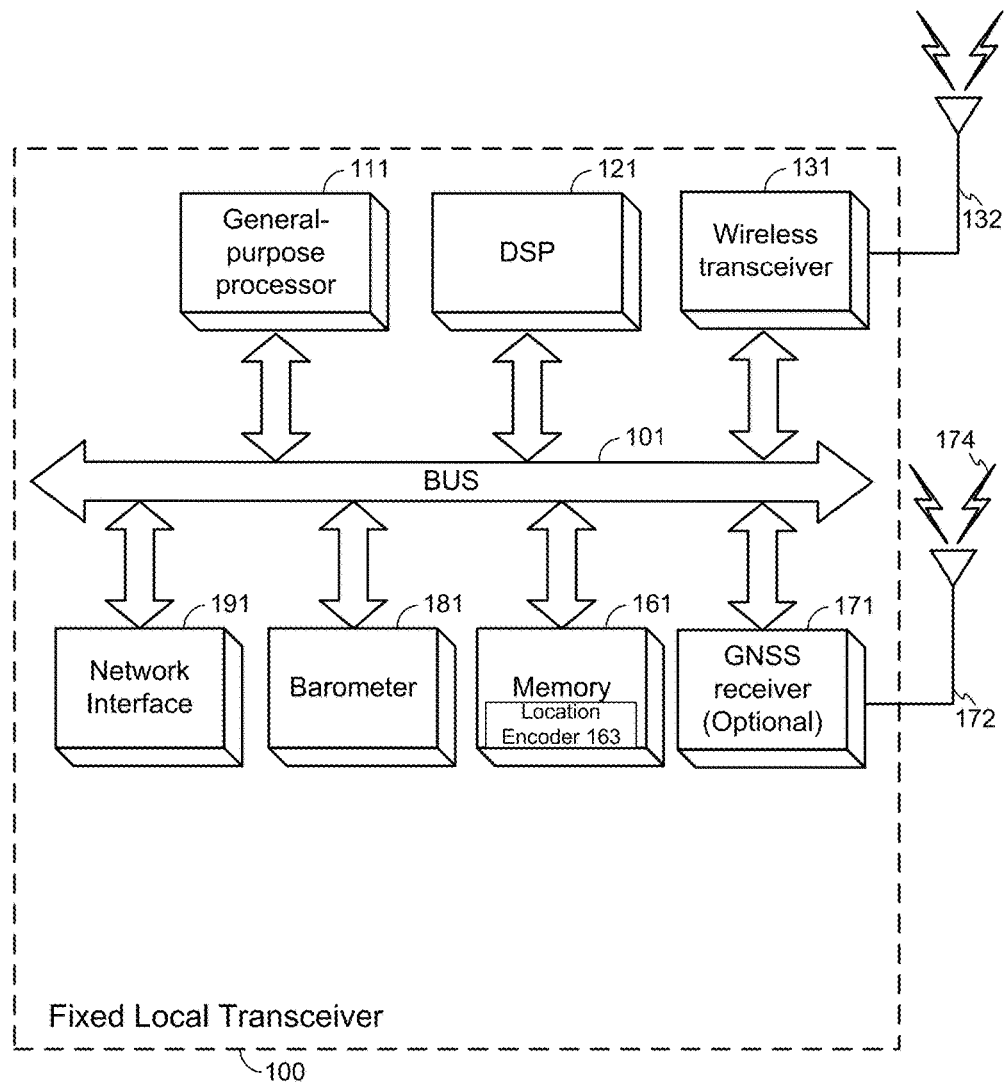
FIG. 1 is an example fixed local transceiver (FLT) for implementing some aspects of the present disclosures.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Methods and systems are presented for estimating locations of fixed local transceivers (FLTs) in a network of FLTs using barometric measurements. Efforts to utilize FLTs in position location determinations, such as in indoor positioning, may be improved by incorporating barometric readings of FLTs, assuming the FLTs possess such capability. For example, the barometric readings from the FLTs may be used to facilitate, supplement, or corroborate what floor of a building a FLT is located on, which in turn may be used to determine what floor a mobile device accessing said FLT is located on.

However, problems may arise when trying to rely on raw or uncalibrated barometric readings from a FLT. For example, barometers installed in FLTs may vary widely in the pressure measurement provided, even compared to other FLTs that may be installed in the same building and on the same level. FLTs may possess fairly inexpensive and low quality barometers, which may not provide a consistent pressure reading compared to other barometers even if built by the same manufacturer. Furthermore, barometers are known to drift over the lifetime of the barometer, requiring a recalibration of the barometer at fairly frequent and regular intervals. In addition, barometers often provide a different pressure reading over time, due to change in local atmospheric pressure. If a mobile device utilizes an uncalibrated or improperly calibrated barometric reading or correction from a FLT that experiences one or more of these errors, the mobile device may miscalculate its own height. Thus, in an effort to improve accuracy of positioning techniques using barometric readings of FLTs (e.g., for indoor positioning purposes, assistance data, etc.), it may advantageous to obtain more refined and/or consistent barometric readings of the FLTs themselves.

Aspects of the present disclosures provide methods for calibrating barometric readings of one or more FLTs by generating one or more reference barometric values. A barometric value is produced by a single FLT station. The barometric value may be a raw barometric pressure measurement or a pressure measurement that is corrected or calibrated by one or more modeled parameters, such as an estimated altitude, a barometer calibration value, a reference to mean sea level, or some other altitude or height. The height or calibration value may have an unknown error and therefore the barometric value may have an unknown error. However, as explained further below, at some point in the creation or maintenance of an FLT group, the devices may be kept at the same height or held at a known height difference so that these errors may be removed by calibration. The FLT devices may also arrive at the site having been factory calibrated. This factory calibration may be improved upon or used to skip the coordinating process. Once these calibration or relative height errors are removed by calibration, the FLTs may be deployed to different heights, and their relative heights may be determined by use of an average of pressure reading at similar points in time at their new fixed locations, and, in some embodiments, application of an adiabatic lapse rate model. Once these relative heights are determined, each FLT may calibrate its readings to agree with a certain reference barometric value or height in a coordinated way, thus producing a barometric value that may be combined with those of other FLTs in the group in a coordinated way. Thus, a combination of barometric values from a plurality of FLTs may be coordinated to produce the best accuracy. These coordinated barometric values can then be combined to form a single combined barometric value, referred to herein as a reference barometric value.

A reference barometric value may represent a consistent and reliable barometric value associated with one or more FLTs that a mobile device or other device relying on barometric values from the one or more FLTs may use for various applications, including indoor positioning and augmenting assistance data. For example, if there are multiple barometric FLTs at substantially equal altitude in a building, where each FLT may provide a different raw barometric reading, a single reference barometric value may be generated for all of these FLTs, so that a mobile device accessing any of the FLTs on the floor may receive a consistent barometric reading for use in various applications. The altitude constraint may be relaxed if the relative altitude of the FLTs is known and an adiabatic lapse rate model can be applied. In such a case, all FLTs may report pressure readings relative to a reference altitude, such as mean sea level, coordinating these readings such that they can be coherently averaged.

These concepts and related embodiments will be discussed in more detail, below.

Referring to FIG. 1, an example fixed local transceiver (FLT) 100 used to implement some aspects of the present disclosures is illustrated. Here, FLT 100 may include a general-purpose processor(s) 111, memory 161, DSP(s) 121, a wireless transceiver 131, a bus 101, antennas 132 and 172, in some cases a global navigation satellite system (GNSS) receiver 171, barometer 181, and network interface 191. In some embodiments, antennas 132 and 172 may be the same antenna. Memory 161 may contain a location encoder 163 that may be configured to encode information pertaining to the location of FLT 100 and/or store the location of a previously encoded location of a FLT. Barometer 181 may provide a barometric reading of FLT 100. In some cases, the barometer may provide the barometric reading in units of atmospheres, Pascals, bars, millibars, torr, psi, or any other suitable units of measurement. The readings from barometer 181 may be stored in memory 161, and/or may be transmitted to a mobile device and/or server by the wireless transceiver 131 via antenna 132. In some embodiments, general-purpose processor 111 may compute a reference barometric value based on the barometer 181 readings and/or additional values via signals received by transceiver 131 or GNSS receiver 171 using antennas 132 or 172. In some embodiments, the additional barometric values may be received by network interface 191. The barometric values may be processed by DSP 121 or processor 111. These reference barometric values may be stored in memory 161 and/or transmitted to a server or mobile devices for use in various applications. In some cases, FLT 100 may not include a barometer 181. In these cases, the present techniques may still provide a reference barometric value based on one or more FLTs known to be associated with said FLT and being equipped with a barometer 181. FLT 100 may be referred to as a Home NodeB (HNB) or Home eNode B (HeNB). Example FLTs 100 may include access points (e.g. WiFi access points), femto cells, base stations, picocells, macrocells, Bluetooth™ transceiver, Zigbee™ transceiver or other suitable FLT type.

In some embodiments, FLT 100 may be equipped with multiple antenna groups, not shown. The multiple antennas may facilitate communication with multiple mobile devices and/or a server, such as a FLT network server 200, discussed more below.

Figure 2:
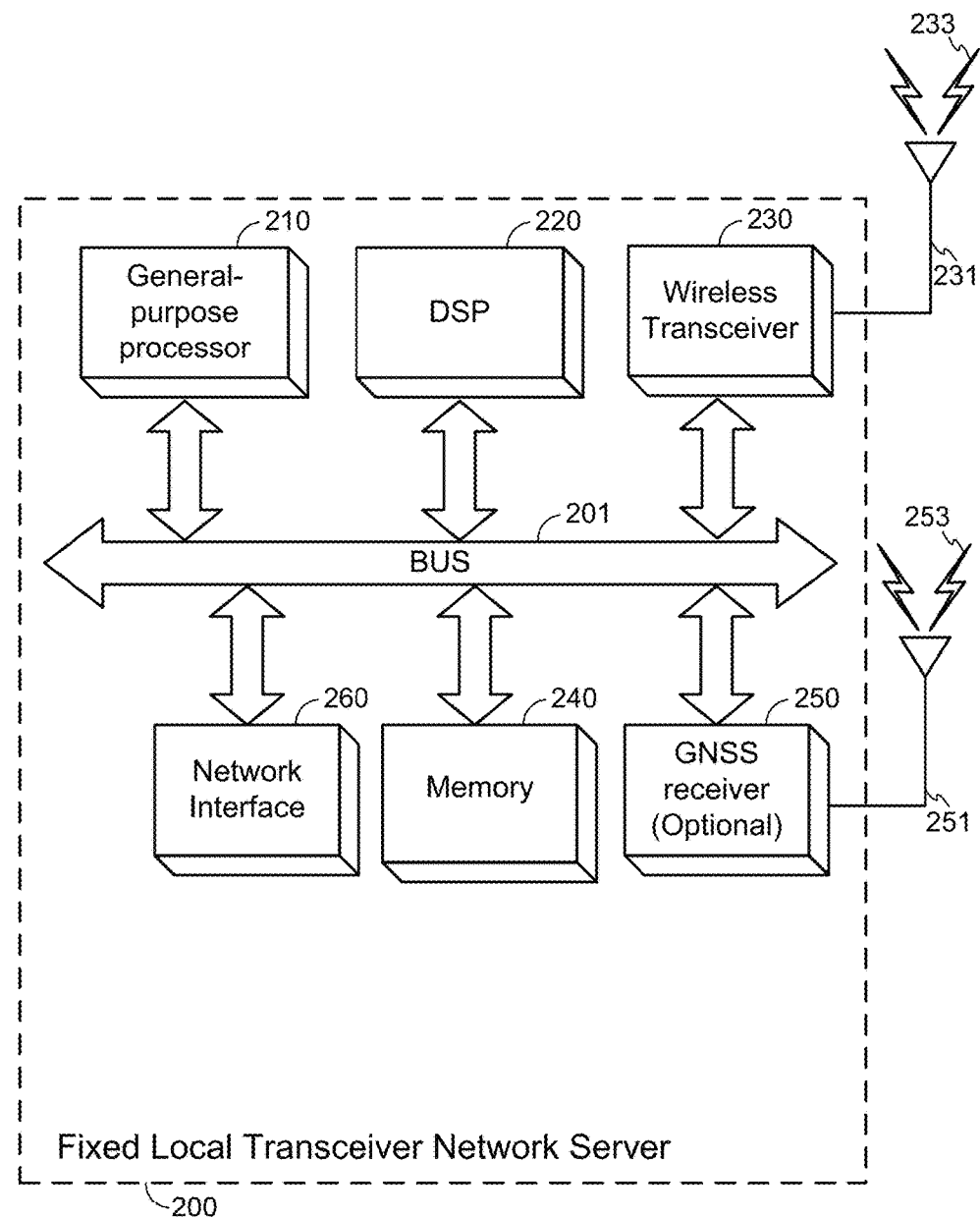
FIG. 2 is an example network server for implementing some aspects of the present disclosures.

FIG. 2 illustrates an exemplary fixed local transceiver (FLT) network server 200, according to some embodiments. FLT network server 200 may be in communication with a plurality of FLTs, including FLTs like FLT 100. The FLT network server 200 may be configured to receive, aggregate or combine, and process location data from the plurality of FLTs, including barometric readings, as well as various other information about the FLTs, such as identifying information, manufacturing information, horizontal and/or vertical positions or offsets of the FLTs and health and status information of the FLTs. In some cases, server 200 may be viewed as a central hub between FLTs in the network. Server 200 may include a global navigation satellite system (GNSS) receiver 250, antenna 251, a general-purpose processor(s) 210, DSP 220, wireless transceiver 230, antenna 231, memory 240, network interface 260, and a bus 201. Wireless transceiver 230, may enable server 200 to transmit and receive signals wirelessly via antenna 231. The signals may include, in some embodiments, barometric readings from the plurality of FLTs. Server 200 may transmit signals to the various FLTs associated in its network and may receive signals from the various FLTs via network interface 260 and/or wireless transceiver 230. DSP 220 may also be included in the server 200 and may be configured to process the wireless signals. In some embodiments, server 200 may be interconnected to other devices and/or networks through wired means (not shown), such as intranets or the Internet. For example, wired means may enable communication with distant FLTs outside of wireless range.

The GNSS receiver 250 may be capable of receiving GNSS signals 253 via antenna 151 (e.g., a GNSS antenna) coupled to the GNSS receiver 250. The GNSS receiver 250 may also process, in whole or in part, the GNSS radio signals 253. The radio signals 253 may include location data from the plurality of FLTS (e.g., barometric readings) and/or other information about the FLTs, such as identifying information, manufacturing information, horizontal and/or vertical positions or offsets of the FLTs and health and status information of the FLTs. The GNSS receiver 250 may receive, aggregate or combine, and process location data of the GNSS radio signals 253. In some embodiments, processor(s) 210, memory 240, and/or DSP(s) 220 may also be utilized to receive, aggregate or combine, and process the GNSS signals 253, in whole or in part, in conjunction with GNSS receiver 250. The storage of GNSS or other signals may be done in memory 240 or other registers (not shown).

Server 200 may be configured to receive, using the wireless transceiver 230 or the GNSS receiver 250, raw, calibrated or referenced barometric values from one or more FLTs. The server 200 may generate (e.g., using the processor 210) one or more reference barometric values and may transmit (e.g., using the wireless transceiver 230) the one or more reference barometric values to various FLTs in the network and/or to mobile devices in range of the FLTs.

Figure 3:
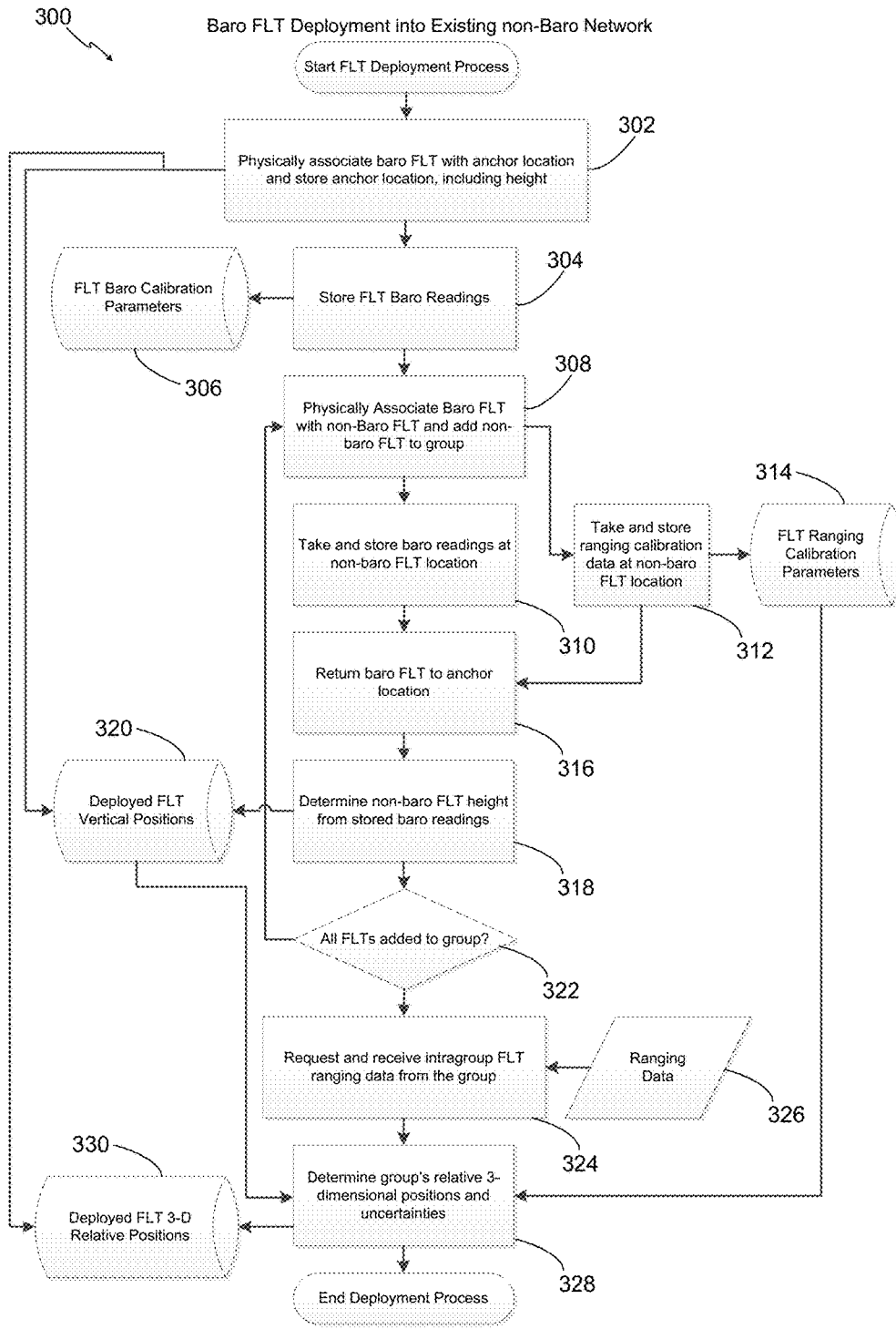
FIG. 3 illustrates an example process flow for deploying a barometric FLT into an existing non-barometric FLT network, according to some embodiments.

Referring to FIG. 3, flowchart 300 describes an example process for deploying FLTs equipped with barometers into an existing network of FLTs not equipped with barometers. Calibration parameters associated with reference barometric values may be determined as part of the process, and are described herein. Starting at block 302, the process may include physically associating a FLT equipped with a barometer (a "barometer FLT" or "baro FLT") with an anchor location. The location of the anchor location may be stored in the baro FLT, including height. As used herein, an anchor location may refer to a location whose position, including height or altitude, is known independently from barometric readings associated with any FLTs. The anchor location may be established through various means, for example via GPS positioning techniques, independent altimeters, or even reference to conventional contour maps. The anchor location may, in fact, remain a variable in terms of absolute coordinates. However, the anchor may remain in a fixed place while two or more FLTs are calibrated relative to each other at its location.

At block 304, readings from the baro FLT may be stored, either in the baro FLT or other repository for later retrieval, such as a FLT network server. The readings may include barometric readings contemporaneously recorded at the time, and other assistance data. At block 306, these readings may be used to generate calibration parameters for the baro FLT.

At block 308, the process continues with physically associating the baro FLT with a FLT not equipped with a barometer (a "non-barometric FLT" or "non-baro FLT"). For example, the baro-FLT may be moved from the anchor location to near or next to where a non-baro is already installed. The location of the non-baro FLT may be on the same or a different floor or height as the anchor location. The non-baro FLT may be added to the FLT network being deployed and configured with accurate reference barometric values via a database recorded in one or more of the FLTs, or at a centralized repository such as a FLT network server.

At block 310, barometric readings from the baro-FLT may be recorded at the non-baro location. The baro-FLT therefore may have recorded barometric values at both the anchor location and the non-barometric FLT location, which may be used for comparison later to establish a known pressure difference and therefore a known height difference between the anchor location and the non-barometric FLT location, according to an adiabatic lapse rate model in some embodiments. These values may also be stored in similar ways as other stored values described above.

Additionally, at block 312, ranging calibration data may be measured and stored at the non-baro FLT location. The calibration data may include data that may be used to determine a reference time delay or signal strength value at the non-baro FLT location, based at least in part on measurements made between the two FLTs when they are in close proximity or a well-known distance to each other. For example, the calibration parameter may include a difference in round trip time readings and the expected time delay, given a known distance between them. The calibration data may also include an average signal strength observed at either or both of the FLTs when one FLT receives a signal from the other. In some embodiments, the anchor location and multiple non-baro FLT locations may be on the same floor, assuming there are multiple non-baro FLTs already installed on the same floor. In another example, the calibration data may also include the median difference between the barometric readings at the anchor location and multiple non-baro FLT locations occurring on the same floor.

At block 314, FLT ranging calibration parameters may be generated and stored. These parameters may include the calibration data generated at block 312, and may include additional data. For example, an associated height or floor may be included with the generated barometric calibrations in block 312. For example, based on knowledge of what floor or height the non-baro FLT location is, said floor or height may be associated with the computed difference in barometric readings between the non-baro FLT location and the anchor location. Thus, if a mobile device accesses barometric data from the non-baro FLT at a later time, the mobile device can know the difference in barometric readings from the anchor location and what floor or height that difference is associated with. Thus, if the mobile device pressure is calibrated by the barometric readings of the anchor location, then the mobile device can compute a difference in barometric readings from the anchor location, compare that difference to the readings of the non-baro FLT, and compute an altitude difference using the adiabatic lapse rate model. In some embodiments, based on the computed altitude difference, it may be determined what floor the mobile device is on.

In some embodiments, additional information may be determined to provide additional assistance data or other calibration values. For example in block 316, the baro-FLT may be returned to the anchor location, and at block 318, a height of the non-baro FLT may be determined from the stored baro readings. The difference between the barometric readings at the anchor location and the non-baro FLT height may be converted to a height difference based on known methods for associating barometric data with height or altitude. These values may be stored in block 320 as deployed FLT vertical positions.

At block 322, the process may loop back to block 308 for each non-baro FLT in the network, if it is determined that all FLTs have not yet been added to the group or network. If all FLTs have been accounted for, then in some embodiments, the process may proceed to block 324, which involves requesting and receiving intragroup FLT ranging data from the group. This step may relate to determining or constructing a map including the positions of the FLTs in the network. The ranging data may be supplied from block 326, which may be based on the individual ranging measurements determined from blocks 306, 312, 314, and/or 320. Additionally, ranging data may include various wireless ranging measurements, including round trip time (RTT) or received signal strength indicator (RSSI) measurements from each of the FLTs.

At block 328, the process may include determining the group's relative 3-dimensional positions and uncertainties using the intragroup ranging data and the FLT ranging calibration parameters. These determinations may be expressed as position coordinates and stored as deployed FLT 3-dimensional relative positions in block 330. Thus, this process describes one example of determining barometric reference or calibration parameters for use in deploying a network of barometric and non-barometric FLTs, given that at least some non-barometric FLTs are already installed at various locations.

Figure 4:
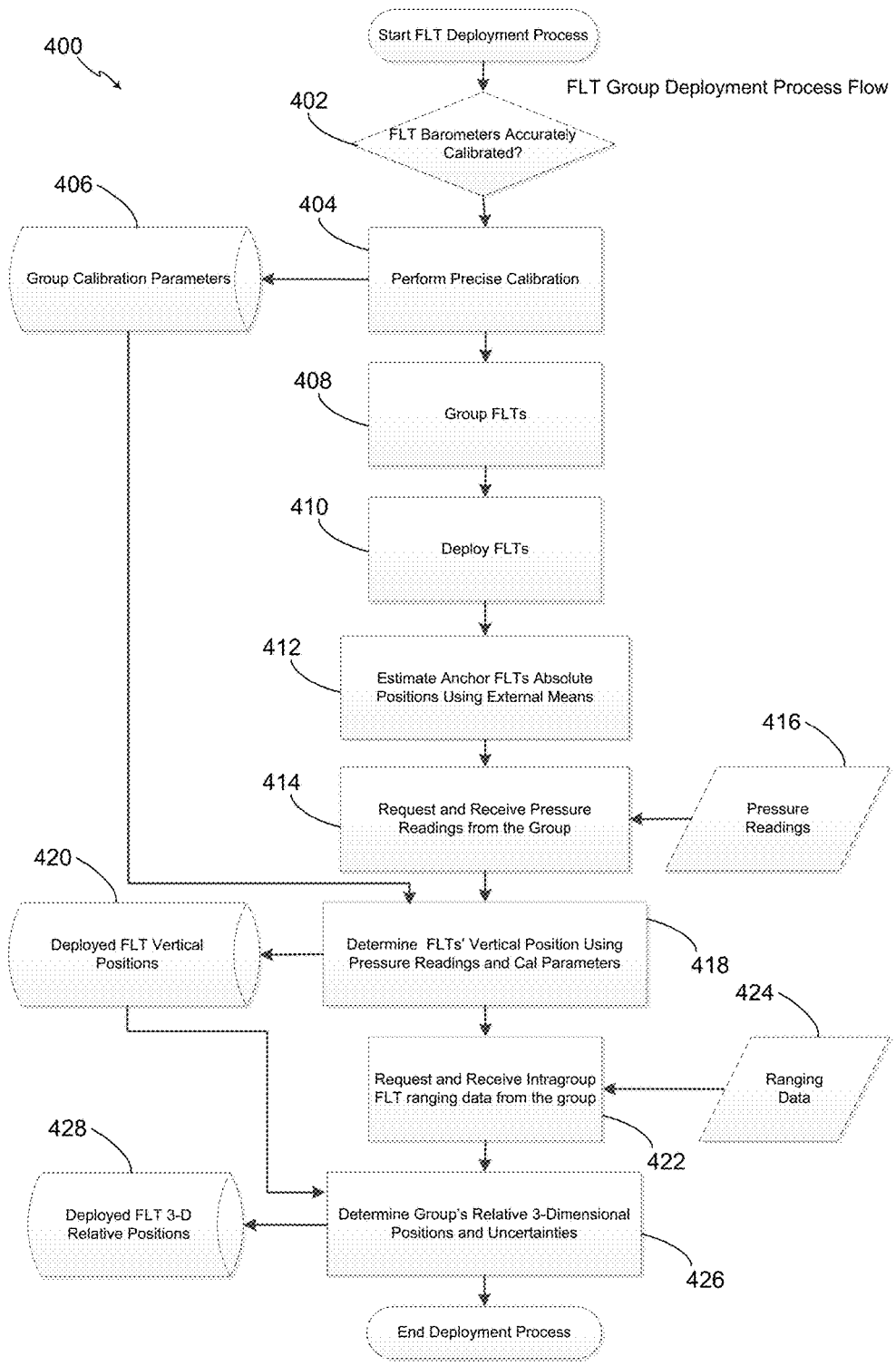
FIG. 4 illustrates an example process flow for deploying a group of barometric FLTs absent an existing non-barometric FLT network, according to some embodiments.

Referring to FIG. 4, flowchart 400 illustrates another example process for deploying and calibrating FLTs using barometric readings, this time in the context of deploying a group of baro-FLTs. Starting at block 402, a determination is made whether each of the baro-FLTs are accurately calibrated. If not all baro-FLTs are calibrated, then at block 404, a calibration process may be performed for each of the non-calibrated baro-FLTs. An example calibration process may include determining a reference barometric value, based on an anchor location with a known height and a corresponding and reliable barometric measurement. The baro-FLTs may be placed at the same height as the anchor location, and the barometric readings (or the average thereof) at the anchor location may be adopted by the baro-FLTs to be the reference barometric value, and the calibration parameter for each baro-FLT may be the difference between the anchor location barometric reading and the baro-FLTs original, raw barometric readings at that height. As another example, the baro-FLTs may not be at the same level as the anchor location, e.g., they may all be on a different floor from the anchor location, but their height differences relative to the anchor location are known. For example, by knowing what floor they are on, the average height per floor and the relative number of floors above or below the anchor location. In this case, their barometric readings may be associated by referencing them to mean sea level (MSL) or some common height. The difference between these mean or, median or some other average values, relative to a commonly agreed altitude, may be calibrated out by adjusting the non-anchor baro FLT readings or by adjusting all FLT readings to a commonly agreed reference such that all baro FLTs may provide substantially the same barometric corrections in the local area. These corrections may then be supplied to non-baro FLTs, such that all FLTs in a given group may provide coordinated corrections to mobile devices in the area. Once the calibration parameters are determined, they may be stored in a group calibration parameters database at block 406. It should be further appreciated that mobile devices will have their own barometric biases. Each mobile device may determine its own barometric bias by calibrating itself to the network using a method similar to those described for the barometric FLTs. Once this calibration is performed, it may be stored in the mobile device, the fixed FLTs, or the central database, such that the mobile height may be determined with greater precision, relative to the local network and its respective map.

At block 408, the baro-FLTs may then be grouped according to various criteria, such as having designated floors or common heights, or by some other common feature, such as relative proximity at their deployed locations. At block 410, the baro-FLTs may be deployed to their designated locations, which in some embodiments may be based on their grouping in block 408. One function of this grouping process is to establish that all FLTs of a group are calibrated relative to each other, thus forming a precise local pressure reference, relative to a local map or anchor location. Thus, the group ID may be associated with a map, along with an estimate for the accuracy of its pressure and/or height. After this grouping and calibration is performed, each FLT that has been calibrated may then be deployed and its height relative to the anchor location may be determined at its deployed location. Furthermore, two or more groups in a local area may be associated and/or merged, once their respective barometric pressure offsets are known using the techniques described herein for adding a single FLT to a group. They may also be associated by calibration to a common barometric calibration source, such as those found at typical airports.

One example of a reference barometric value is a pressure reading relative to a reference height, such as mean sea level. It should be appreciated that said value may not be determined without a barometric reading and knowledge of the height of the barometer. It should be further appreciated that barometers may have biases that need to be calibrated and removed with care in order to provide precise barometric altitude determination relative to the group's local reference frame, typically associated with a local map indicating height values. These height values may have great internal consistency, but be in error relative to some more general coordinate system. So the error between the local coordinate system and the more general coordinate system may be tracked and updated without disturbing the remainder of the map. It is worth noting, then, for local navigation, that barometric readings are precisely coordinated to the local map, and need not be absolutely accurate.

At block 412, in some embodiments, one or more anchor FLTs may be used to facilitate the group FLT deployment process. The one or more anchor FLTs may be positioned at the anchor location, or they may be positioned at other reference locations. For example, one or more FLTs may be designated as an anchor FLT. Each anchor FLT may then be designated as the FLT from which all other FLTs in the group receive coordinated barometric readings. At block 412, the absolute positions of the anchor FLTs may be estimated or determined. These positions may be determined using external means, for example by GPS positioning techniques or determinations based on knowledge of a floor plan of the floor each anchor FLT is positioned at.

At block 414, after the baro-FLTs have been deployed to their designated locations, pressure readings may be requested and received for each of the baro-FLTs. The pressure readings, represented by block 416, may be in the form of various units of pressure as discussed in these disclosures or otherwise known to those of ordinary skill in the art. A FLT network server, anchor FLT(s) or other centralized repository may receive the pressure readings. In some embodiments, the pressure readings may be in the form of raw barometric measurements, while in other embodiments, the pressure readings may be in the form of reference barometric measurements including the calibration parameters.

At block 418, the baro-FLTs' vertical position may be determined using the pressure readings provided by block 414 and the calibration parameters provided in block 404. An example process for determining the vertical positions may include incorporating the calibration parameters with raw pressure readings to generate a calibrated barometric reading, and then converting the calibrated barometric reading into a height measurement using known conversion techniques. In some embodiments, the vertical position may include determining a floor that the baro-FLT is on, which may be computed or estimated based on knowledge of each floor height of the building combined with the determined vertical position of the baro-FLT. These values may then be stored as deployed FLT vertical positions in block 420, and may be stored in one or more FLTs or a central database.

At block 422, in some embodiments and similar to the later blocks in FIG. 3, intragroup FLT ranging data may be requested and received. The ranging data may be represented by block 424, and together with the vertical positions established in block 418, at block 426, relative 3-dimensional positions and uncertainties may be determined for each baro-FLT in the group, which may be stored and represented at block 428. As mentioned previously, the processes for determining these positions may be similar to those described in FIG. 3, e.g. at blocks 324 and 328. Thus, this process describes one example of determining barometric reference or calibration parameters for use in deploying a network of barometric FLTs, even if none of the barometric FLTs were previously deployed. If some baro-FLTs are already deployed, then their inclusion and calibration in the group may be determined analogously using the processes described in FIG. 3, for example.

Figure 5:
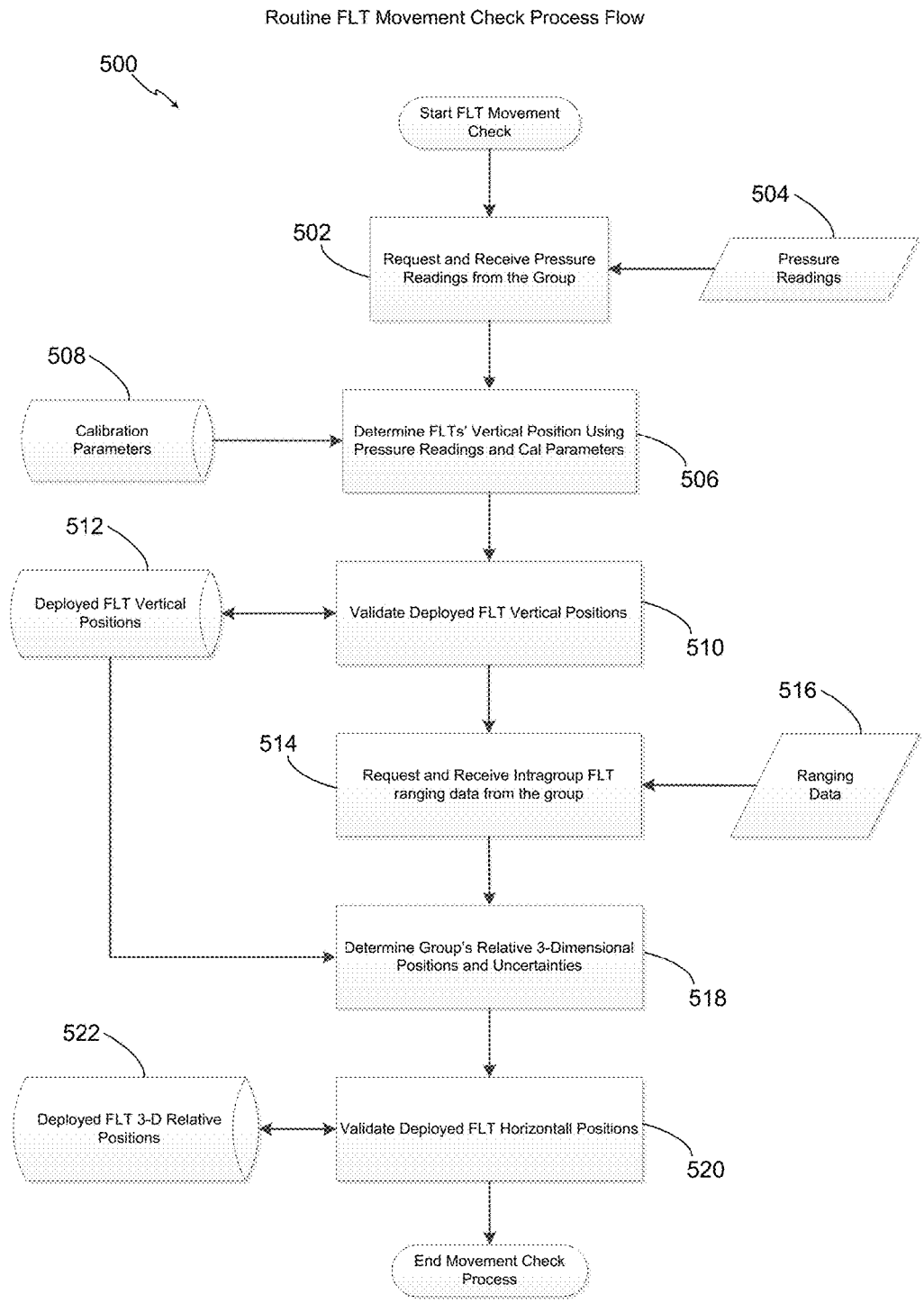
FIG. 5 illustrates an example process flow for a routine check of FLT movement, according to some embodiments.

Referring to FIG. 5, flowchart 500 describes an example process for conducting a routine check for whether a FLT in the network has been moved. In this case, the term routine may refer to this process being performed on a regular or continuous basis, as a sort of periodic check that may be standard to maintain proper health and status of the FLT network. Many of the steps may be similar to those already described in FIGS. 3 and 4, with a difference being that the vertical positions of the FLTs are compared against previous readings to determine whether a FLT is thought to have changed height.

For example, at block 502, a routine check may include requesting and receiving pressure readings from some or all FLTs in the group. A FLT network server or other centralized system may receive various pressure readings 504 from the group. At block 506, a FLT's vertical position may be determined using pressure readings 504 and calibration parameter 508 obtained in previous processes, e.g. during a deployment process. The techniques to determine the vertical position, or in some embodiments, the floor of the FLT, may be similar to those already described in FIGS. 3 and 4.

At block 510, the deployed FLT vertical position may be validated against known determinations made in previous calculations. For example, the FLT may compare its current determined vertical position with a previous log of vertical positions. Alternatively, the vertical positions may be transmitted to a FLT network server or other centralized system that contains a history of recorded pressure readings and/or height measurements. The current determined vertical position may be compared against the history to determine if the FLT has changed height. In some embodiments, a determination may be made if the height has changed beyond some predetermined threshold, in order to account for measurement error in pressure readings and for possible drift in each altimeter's calibration. If it is determined that the change is greater than the threshold, a new height and/or 3 dimensional location may be updated for the FLT, as stored as a deployed FLT vertical or 3 dimensional position in block 512. Alternatively, the FLT barometric pressure sensor and position may be flagged as unreliable until an operator confirms that the position has changed or the altimeter is in error.

Based on any changes, at blocks 514 and 518, the FLT's relative 3-dimensional position and uncertainty may need to be re-checked and/or updated, using at least the ranging data 516. The processes for these may be similar to those described in FIGS. 3 and 4, described above.

Using the determined 3-dimensional positions and uncertainties, horizontal positions of a FLT can be determined. Thus, at block 520, the horizontal positions of the FLT may also be validated and compared against previously recorded horizontal positions based on previously determined 3-dimensional positions. The 3-dimensional relative positions may be validated and/or updated at block 522.

Figure 6:
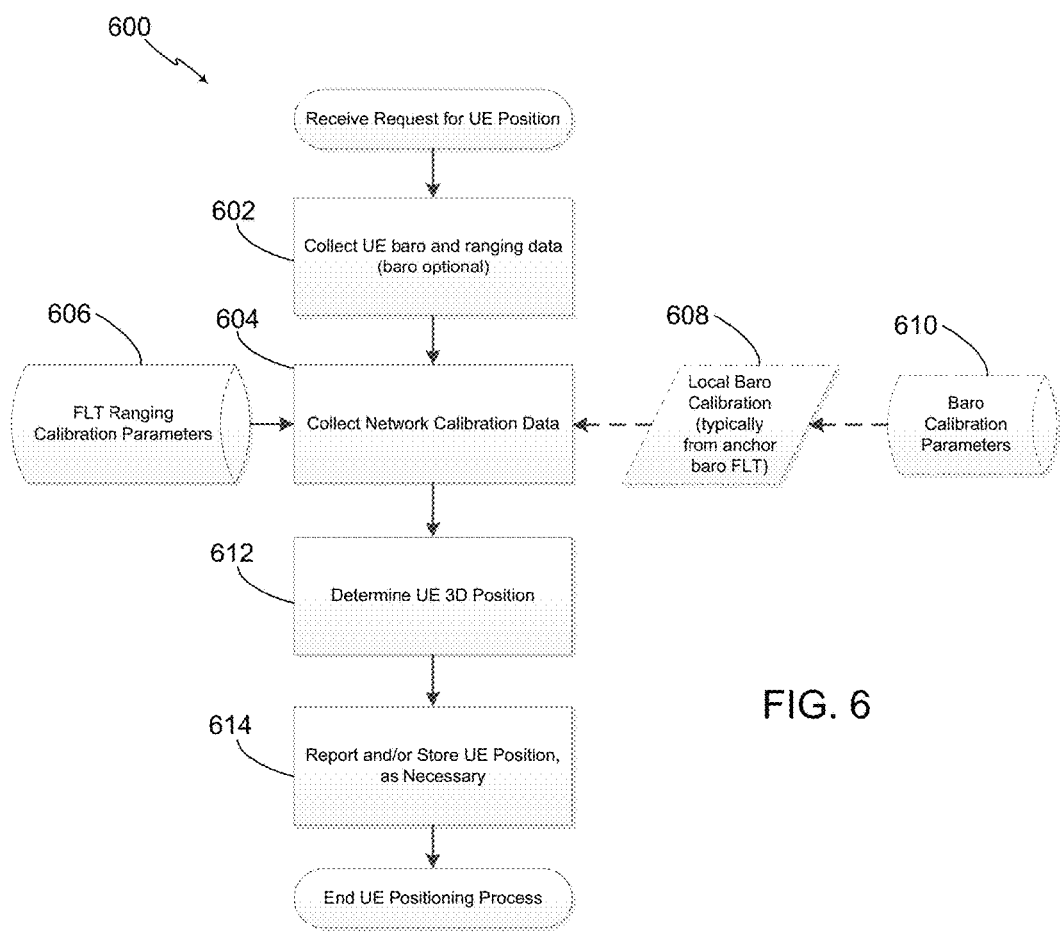
FIG. 6 illustrates an example process flow for positioning a user equipment (UE) using a deployed barometric FLT network, according to some embodiments.

Referring to FIG. 6, flowchart 600 describes an example process by a mobile device, or user equipment (UE) for determining its position using the deployed and calibrated FLT network described in the previous figures, according to some embodiments. The process 600 may be implemented by a position determination engine, in some cases performed by a FLT network server, or at least facilitated by data provided by a FLT network server. In other cases, the UE may receive the data supplied by various FLTs and/or a FLT network server to compute its own position. Persons of ordinary skill in the art would readily understand how to adopt the example descriptions herein for use in either a UE or a positioning engine associated with the FLT network.

At block 602, after receiving a request for determining the UE position, ranging data and possibly barometric data may be collected by the UE. For example, the UE may obtain ranging measurements from a plurality of FLTs nearby. The ranging measurements may include RTT and/or RSSI measurements. In other cases, ranging measurements from satellites in view or cellular base stations may be obtained.

At block 604, calibration data from the FLT network may be collected. For example, the UE may obtain calibration parameters to synchronize its barometric readings with the barometric values associated with the FLT network. In other cases, any calibration parameters for ranging data may also be supplied. These may be based on assistance data describing walls, doors, and other properties of the indoor environment. Ranging calibration parameters may be obtained from block 606, and barometric calibration parameters may be obtained from blocks 608 and/or 610.

Based on the calibration parameters and the ranging data, a 3-dimensional position of the UE may be determined at block 612. In some embodiments, the 3-dimensional position may be in the form of a two dimensional position within a particular floor of the building. At block 614, this position may be reported and/or stored, for example in the UE. In some instances, such as, for example, when an outdoor GPS position fix is performed, an altitude residual error may be noted and fed back to the barometric calibration database for potential adjustment of the baro FLT group calibration parameters to align with GPS-provided altitude information. Alternatively, this information may be provided to the local map, to adjust its known offset from absolute height, and the associated uncertainty appropriately.

Figure 7:
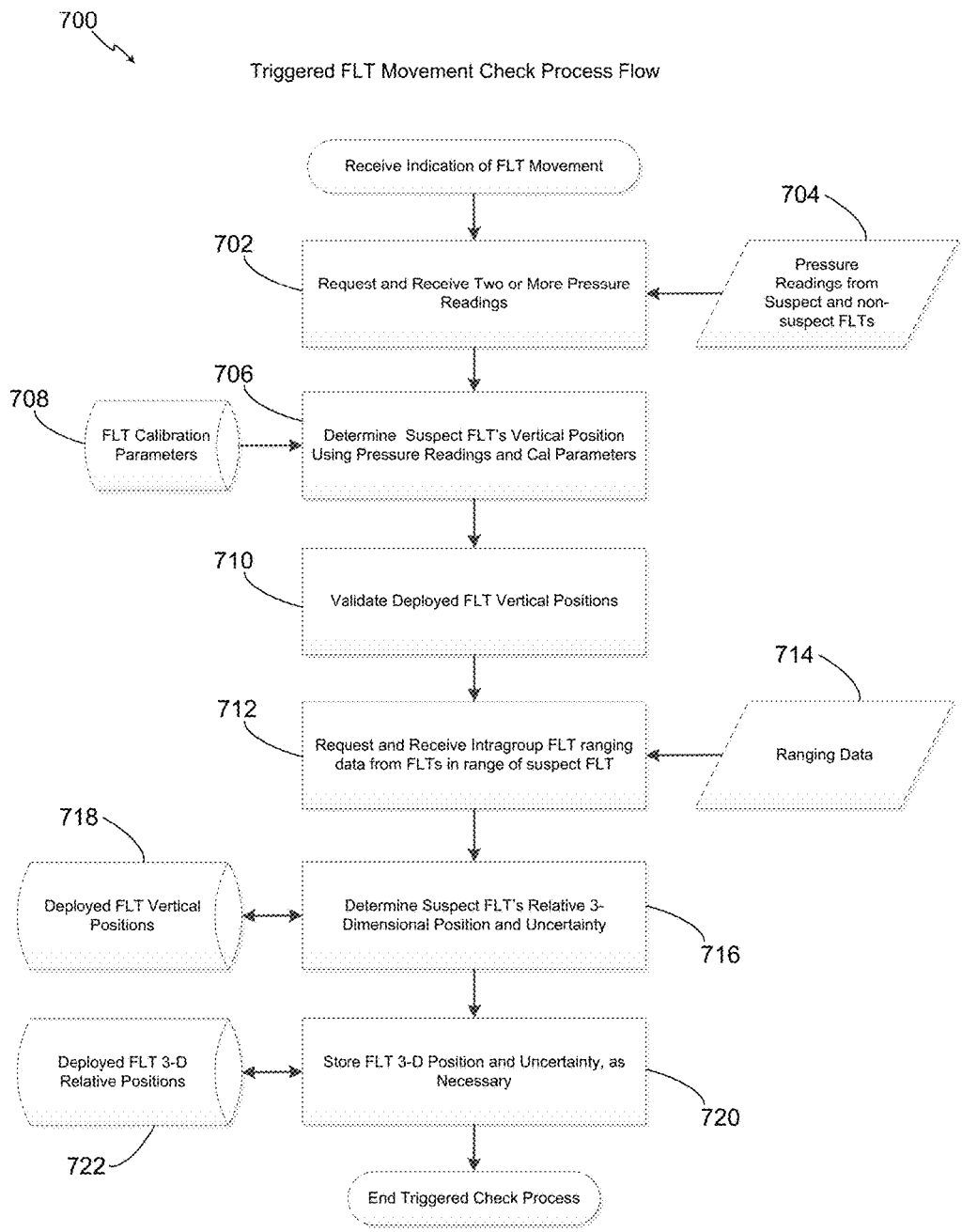
FIG. 7 illustrates an example process flow for checking FLT movement according to a triggered event, according to some embodiments.

Referring to FIG. 7, flowchart 700 describes an example process for a check of FLT movement based on a triggered event. Example trigger events may include an interrupt manually provided by a tech analyst who is repositioning one or more FLTs, a sudden change in assistance data or ranging data provided by a FLT, or a sudden lack of data received from a FLT. In other words, a triggering event may include some occurrence that raises suspicions there is at least one FLT that may be moved or have some other problem.

At block 702, the process may include requesting and receiving two or more pressure readings, where one of the readings is associated with the "suspect" FLT and another is associated with a "non-suspect" FLT, at block 704. The pressure readings may include raw barometric values or calibrated barometric values, in any form discussed in the above disclosures.

At block 706, the process may include determining the suspect FLT's vertical position (or floor) using the pressure readings and any calibration parameters, provided by block 708. The calibration parameters may be consistent with any of the calibration parameters discussed herein. The suspect FLT's vertical position may be determined by applying the calibration parameters to the pressure readings obtained from the suspect FLT using similar techniques described in the above disclosures.

At block 710, the deployed positions of the suspect FLT and other FLTs in the group may be validated. The pressure readings from at least one non-suspect FLT may be used to compare against determinations made about the suspect FLT. For example, if the height position of a non-suspect FLT is consistent with previous readings, then there is higher confidence that any changes in the readings of the suspect FLT may be relied upon.

At block 712, once it has been established the status of the suspect-FLT, intragroup FLT ranging data from FLTs in range of the suspect FLT may be requested and received, from block 714. This data may be used to recompute and adjust the position of the suspect FLT. Notice that not all of the FLTs in the entire network need to be contacted, since this process pertains only to a triggered event, which may be isolated to one or more suspect FLTs.

Thus at block 716, the relative 3-dimensional position and uncertainty of the suspect FLT may be determined, based on similar processes described in the above disclosures. The FLT vertical position may be updated and provided at block 718. Relatedly, at block 720, the 3-dimensional position and uncertainty may be stored, at block 722.

While one FLT may be used as an example in the aforementioned example processes, it is readily apparent to those with skill in the art how the same processes may apply to multiple FLTs. Moreover, it may be apparent how subsections of an entire network may follow these example processes, and embodiments are not so limited.

Figure 8:
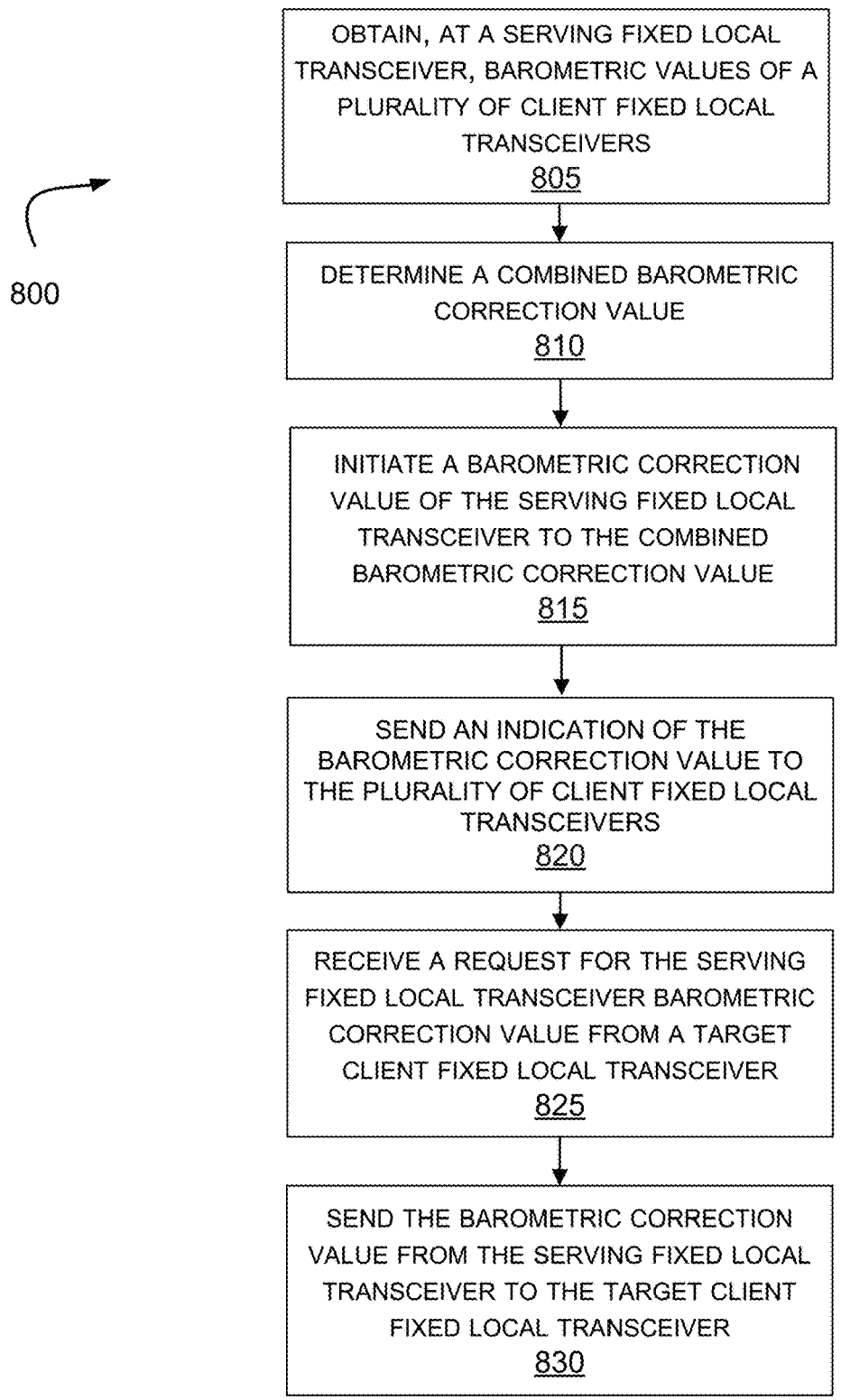
FIG. 8 illustrates an example method according to some embodiments.

Referring to FIG. 8, flowchart 800 illustrates an example series of method steps for providing a combined barometric value. Flowchart 800 may represent a generalized methodology summarizing common portions of the example processes in FIGS. 3, 4, 5, 6, and 7, for example relating to providing a reference barometric value that may be used to calibrate one or more client fixed local transceivers in the network. The method described in the flowchart 800 may be implemented by various means, including the example apparatuses, systems and processors described in any of FIGS. 1, 2, 3, 4, 5 6, and 7. For example, the method of flowchart 800 may be implemented by a serving fixed local transceiver, such as a network server or processor of an indoor navigation system and/or one or more fixed local transceivers of an indoor navigation system.

At block 805 the example method may include obtaining, at a serving fixed local transceiver, barometric values of a plurality of client fixed local transceivers. The serving fixed local transceiver and the client fixed local transceivers may be consistent with any fixed local transceiver descriptions herein, including those in FIGS. 1, 3, 4, 5, 6, and 7. In some embodiments, the serving fixed local transceiver may include an anchor fixed local transceiver. In some embodiments, the serving fixed local transceiver may receive the barometric values from the plurality of fixed local transceivers. In some embodiments, the serving fixed local transceiver may obtain previously received barometric values from a storage device of the serving fixed local transceiver. In some embodiments, the barometric values may include pressure readings from a barometer installed in the client fixed local transceivers. In some cases, the barometric values may include uncalibrated values.

The barometric values of a plurality of client fixed local transceivers can be combined to form a combined barometric value. For example, at block 810, the method may include determining a combined barometric value. In some embodiments, the combined barometric value may be determined by combining barometric values from the plurality of client fixed local transceivers. In some embodiments, a combined altitude value may be determined by combining barometric values from the plurality of client fixed local transceivers. In some embodiments, the barometric values from the plurality of client fixed local transceivers may be adjusted, if necessary, to the same altitude. For example, if the calibrated FLT are deployed on different heights or floors of a building, it may be useful to adjust the raw barometric value for FLT deployed on different heights or floors of a building back to some common reference altitude. In some cases, combining barometric values from the plurality of client fixed local transceivers may include discarding outlier barometric values. For example, barometric values that deviate from an average or mean barometric value of the obtained barometric values by a threshold amount may be discarded. In some cases, combining barometric values from the plurality of client fixed local transceivers may include averaging the barometric values from the plurality of client fixed local transceivers. In some cases, combining barometric values from the plurality of client fixed local transceivers may include determining a median of the barometric values from the plurality of client fixed local transceivers.

At block 815, the method may include initiating a barometric correction value of the serving fixed local transceiver to the combined barometric correction value. Note that the barometric correction value may vary over time due to various effects that cause a change in barometric pressure, such as weather.

At block 820, the method may include sending an indication of the barometric correction value to the plurality of client fixed local transceivers. In an embodiment, the indication of the barometric correction value could be the barometric correction value, so that each of the plurality of client fixed local transceivers may set their barometric pressure to the barometric correction value. In another embodiment, the indication of the barometric correction value could be the respective offset between the respective barometric values of each of the plurality of client fixed local transceivers and the barometric correction value, sending the respective offset to each of the plurality of client fixed local transceivers so that the respective barometric pressure on each of the plurality of client fixed local transceivers can be adjusted to match the barometric correction value. Thus, in either embodiment, the plurality of client fixed local transceivers may use the barometric correction value, directly or indirectly, to correct their respective barometers. In various embodiments, the barometric values of the plurality of client fixed local transceivers may be corrected by one or more modeled parameters, such as an estimated altitude, barometer calibration value, a reference to mean sea level, or some other height. The various corrections may be sent from the serving fixed local transceiver, from a network server, or may be stored on the client fixed local transceivers directly. The height or calibration value may have an unknown error and therefore the barometric value may have an unknown error. The plurality of client fixed local transceivers may be kept at the same height or held at a known height difference so that the errors may be removed by calibration. Once the relative height errors are removed by calibration, the client fixed local transceivers may be deployed to different heights or floors of a building, and their relative heights may be determined by use of an average of pressure readings at similar points in time at their new fixed locations, and application of an adiabatic lapse rate model. Once these relative heights are determined, each FLT may calibrate its readings to agree with a certain reference height in a coordinated way, thus producing a barometric value that may be combined with those of other FLTs in the group in a coordinated way. Accordingly, a combination of barometric values from a plurality of FLTs may be coordinated to produce an accurate barometric reading.

At block 825, the method may include receiving a request for the serving fixed local transceiver barometric correction value from a target client fixed local transceiver. In some embodiments, the plurality of client fixed local transceivers are located at the same altitude or location as a target client fixed local transceivers (e.g., on the same floor of a building). The target client fixed local transceiver may be consistent with any fixed local transceiver descriptions herein, including those in FIGS. 1, 3, 4, 5, 6, and 7. In some embodiments, the request may be implied when obtaining the barometric values from the plurality of client access points. For example, upon obtaining the barometric values and determining the combined barometric value, the serving fixed local transceiver may imply a request from one or more client fixed local transceivers for the combined barometric value. In some embodiments, the client fixed local transceiver may be a member of a local group and may request the barometric correction value of the serving fixed local transceiver so that it can provide it to a mobile device or another entity that is attempting to determine the altitude of the mobile device. For example, the client fixed local transceiver may request the serving fixed local transceiver barometric correction value in the event it did not have a barometer itself, its barometer was not coordinated with the serving fixed local transceiver, there is a desire to minimize errors associated with different calibration sources in the network, or the like.

At block 830, the method may include sending the barometric correction value from the serving fixed local transceiver to the target client fixed local transceiver. For example, the barometric value may be sent from the serving fixed local transceiver to the target client fixed local transceiver upon receiving the request from the target client fixed local transceiver. In some embodiments, the method may allow for a delay in the request (at some period after setting the barometric correction value of the serving fixed local transceiver) and potential subsequent weather drift that may cause a change in barometric pressure. For example, the serving fixed local transceiver may, upon receiving the request, recalculate the combined barometric value based on the conditions at the time the request is received. In another example, the serving fixed local transceiver may, upon receiving the request, send the value of the barometric pressure measured at the serving fixed local transceiver at the time the request is received. The measured barometric pressure value will be accurate because the serving fixed local transceiver was calibrated and set to the combined value during the initial calibration. Accordingly, the requesting client fixed local transceiver can set its barometric pressure to the value of the severing transceiver. In some embodiments, the serving fixed local transceiver may periodically recalibrate to account for drift at the local transceivers if necessary and send new values out for each local transceiver to call against. In some embodiments, the serving fixed local transceiver may send the combined barometric correction value and a weather offset that was tracked on the serving transceiver to the requesting client fixed local transceiver. In some embodiments, the serving fixed transceiver may, in addition to the barometric correction value, also provide an altitude at which it is valid, so that a fixed local transceiver located at a different altitude may adjust the barometric correction value for the altitude difference between the serving fixed transceiver and the fixed local transceiver, for example, based upon a predicted difference in barometric pressure per unit of altitude.

In some embodiments, the method may further comprise obtaining altitude values corresponding to the locations of the plurality of client fixed local transceivers, determining a combined altitude value, and sending the combined altitude value from the serving fixed local transceiver to the target client fixed local transceiver. As noted above, in some embodiments, the combined altitude value may be determined by combining barometric values from the plurality of client fixed local transceivers.

Figure 9:
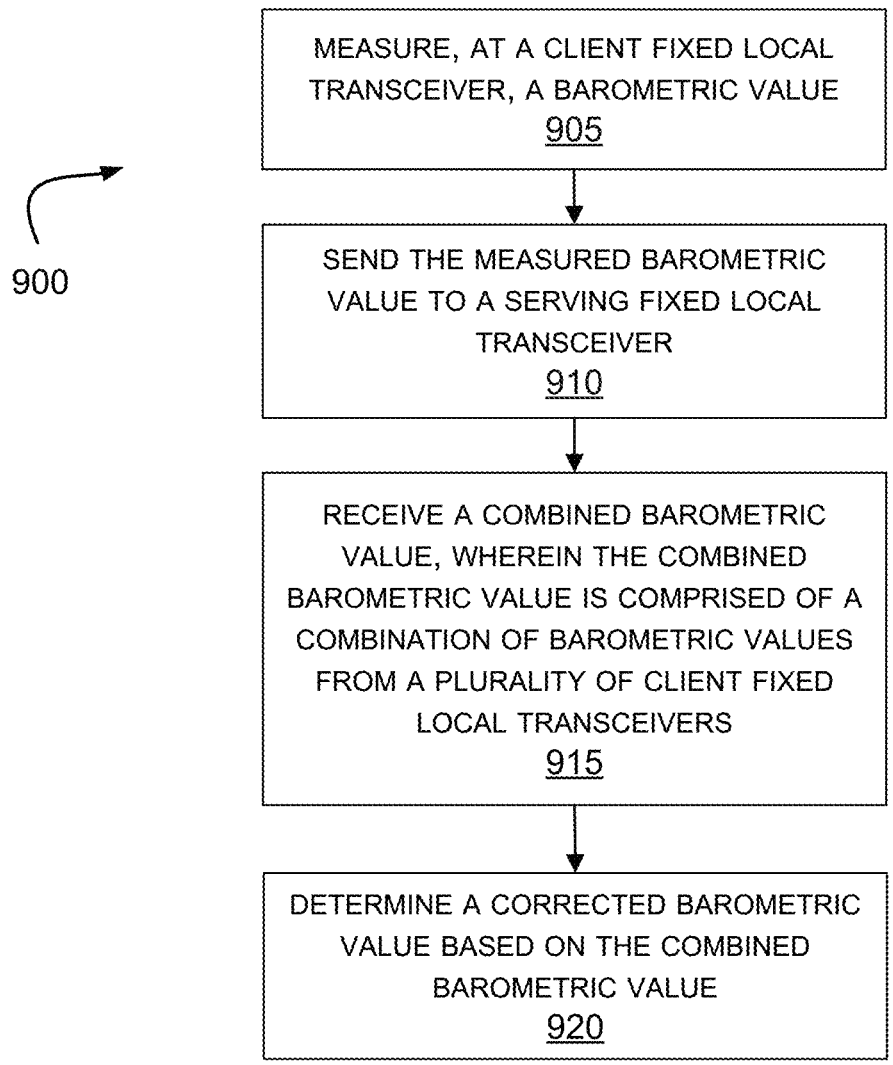
FIG. 9 illustrates an example method according to some embodiments.

Referring to FIG. 9, flowchart 900 illustrates an example series of method steps for providing a combined barometric value. Flowchart 900 may represent a generalized methodology summarizing common portions of the example processes in FIGS. 3, 4, 5, 6, and 7, for example relating to obtaining a reference barometric value that may be used to calibrate a client fixed local transceiver in the network. The method described in the flowchart 900 may be implemented by various means, including the example apparatuses, systems and processors described in any of FIGS. 1, 2, 3, 4, 5, 6, and 7. For example, the method of flowchart 900 may be implemented by a client fixed local transceiver, such as one or more fixed local transceivers of an indoor navigation system.

At block 905, the example method may include measuring, at a client fixed local transceiver, a barometric value. For example, the client fixed local transceiver may include a barometer that is configured to measure the barometric value. The client fixed local transceiver may be consistent with any fixed local transceiver descriptions herein, including those in FIGS. 1, 3, 4, 5, 6, and 7. In some embodiments, the barometric values may include pressure readings from the barometer installed in the client fixed local transceiver. In some cases, the barometric value may include an uncalibrated barometric value.

At block 910, the example method may include sending the measured barometric value to a serving fixed local transceiver. The serving fixed local transceiver may be consistent with any fixed local transceiver descriptions herein, including those in FIGS. 1, 3, 4, 5, 6, and 7. In some embodiments, the serving fixed local transceiver may include an anchor fixed local transceiver.

At block 915, the example method may include receiving a combined barometric value. The combined barometric value may be comprised of a combination of barometric values from a plurality of client fixed local transceivers. For example, the serving fixed local transceiver may determine a combined barometric value by combining barometric values from the plurality of client fixed local transceivers. The client fixed local transceiver may then receive the combined barometric value from the serving fixed local transceiver.

At block 920, the example method may include determining a corrected barometric value based on the combined barometric value. For example, the measured barometric value may be inaccurate due to a faulty measurement by the barometer on the client fixed local transceiver. The corrected barometric value is based on the combined barometric value (e.g., of other client fixed local transceivers located at the same altitude as the client fixed local transceiver, such as the same floor of a building), and may be a more accurate barometric value than the measured barometric value. In some cases, the combined barometric value not include outlier barometric values (e.g., the outliers may be discarded by the serving fixed local transceiver). In some cases, the combined barometric value may include an average of the barometric values from the plurality of client fixed local transceivers. In some cases, the combined barometric value may include a median of the barometric values from the plurality of client fixed local transceivers. As a result, the corrected barometric value may be a more accurate indication of the barometric value of the client fixed local transceiver. In some embodiments, the corrected barometric value may be determined to be equal to the combined barometric value.

In some embodiments, the example method may comprise sending an altitude value corresponding to a location of the client fixed local transceiver, receiving a combined altitude value, wherein the combined altitude value is comprised of a combination of altitude values from the plurality of client fixed local transceivers, and adjusting the corrected barometric value based on the combined altitude value. In some embodiments, the combined altitude value may be determined by the serving fixed local transceiver by combining barometric values from the plurality of client fixed local transceivers. In some embodiments, the example method may comprise setting the corrected barometric value to the combined barometric value and adjusting the corrected barometric value for a difference in altitude based on the combined altitude value.

In some embodiments, the example method may comprise determining a 3-dimensional position of the client fixed local transceiver based at least in part on the combined barometric value. The position or location of the client fixed local transceiver may be determined using any of the techniques described above.

Many embodiments described herein may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 10:
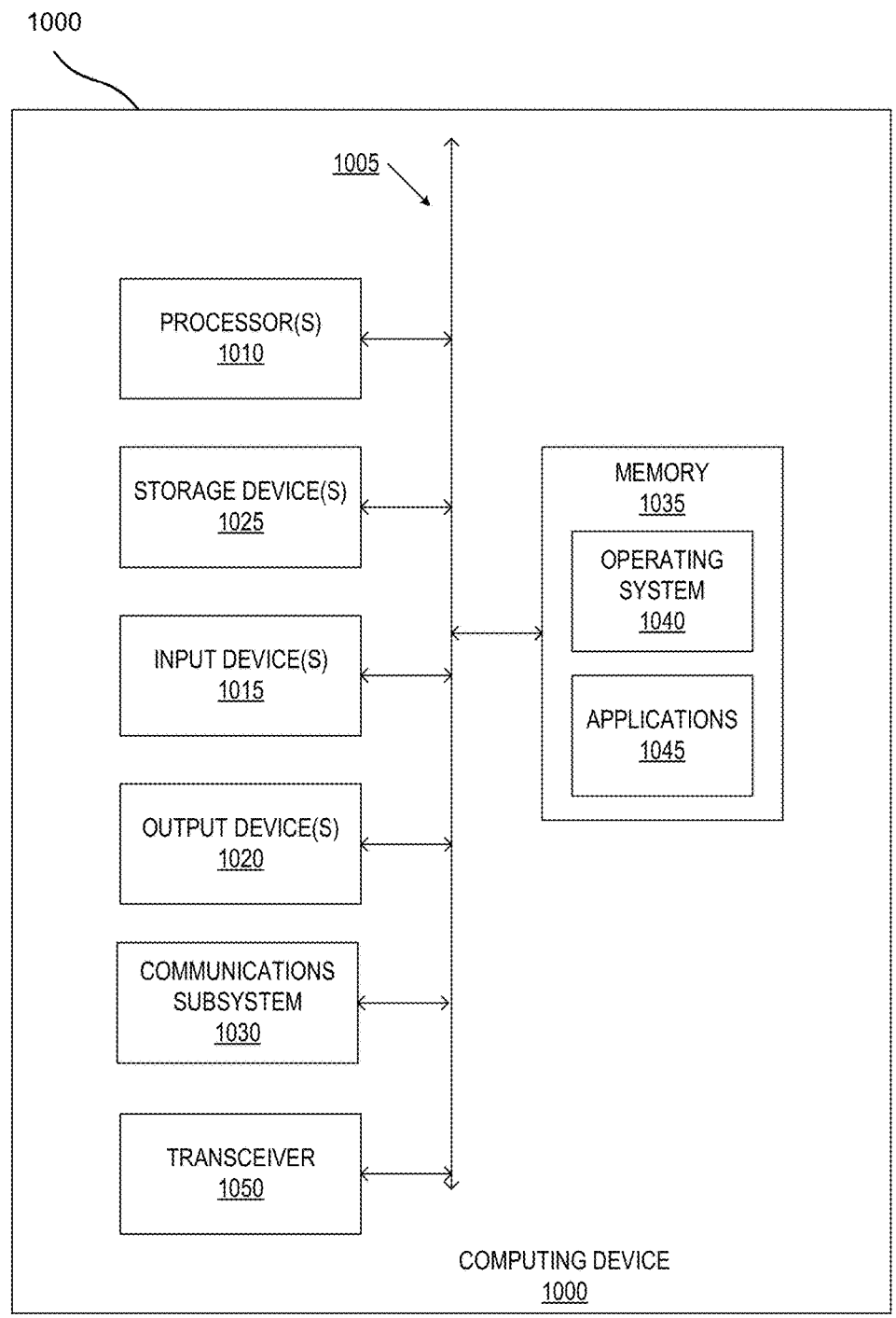
FIG. 10 illustrates an example computer system according to some embodiments.

Having described multiple aspects of improving assistance data parameters in floor plan maps for indoor positioning, an example of a computing system in which various aspects of the disclosure may be implemented will now be described with respect to FIG. 10. According to one or more aspects, a computer system as illustrated in FIG. 10 may be incorporated as part of a computing device, which may implement, perform, and/or execute any and/or all of the features, methods, and/or method steps described herein. For example, computer system 1000 may represent some of the components of a hand-held device. A hand-held device may be any computing device with an input sensory unit, such as a wireless receiver or modem. Examples of a hand-held device include but are not limited to video game consoles, tablets, smart phones, televisions, and mobile devices or mobile stations. In some embodiments, the system 1000 is configured to implement any of the methods described above. FIG. 10 provides a schematic illustration of one embodiment of a computer system 1000 that can perform the methods provided by various other embodiments, as described herein, and/or can function as the host computer system, a remote kiosk/terminal, a point-of-sale device, a mobile device, a set-top box, and/or a computer system. FIG. 10 is meant only to provide a generalized illustration of various components, any and/or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a camera, wireless receivers, wireless sensors, a mouse, a keyboard and/or the like; and one or more output devices 1020, which can include without limitation a display unit, a printer and/or the like. In some embodiments, the one or more processor 1010 may be configured to perform a subset or all of the functions described above with respect to FIGS. 8-9. The processor 1010 may comprise a general processor and/or and application processor, for example. In some embodiments, the processor is integrated into an element that processes visual tracking device inputs and wireless sensor inputs.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a non-transitory working memory 1035, which can include a RAM or ROM device, as described above. In some embodiments, communications subsystem 1030 may interface with transceiver(s) 1050 configured to transmit and receive signals from access points or mobile devices. Some embodiments may include a separate receiver or receivers, and a separate transmitter or transmitters.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 10, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1000) to perform methods in accordance with the disclosure. For example, some or all of the procedures of the described methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein, for example methods described with respect to FIGS. 3, 4, 5, 6, 7, and 8.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communications subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010. Memory 1035 may contain at least one database according to any of the databases and methods described herein. Memory 1035 may thus store any of the values discussed in any of the present disclosures, including FIGS. 1, 2, 3, 4, 5, 6, 7, and 8 and related descriptions.

The methods described in FIGS. 3, 4, 5, 6, 7, and 8 may be implemented by various blocks in FIG. 10. For example, processor 1010 may be configured to perform any of the functions of blocks in flowcharts 800 and/or 900. Storage device 1025 may be configured to store an intermediate result, such as a globally unique attribute or locally unique attribute discussed within any of blocks mentioned herein. Storage device 1025 may also contain a database consistent with any of the present disclosures. The memory 1035 may similarly be configured to record signals, representation of signals, or database values necessary to perform any of the functions described in any of the blocks mentioned herein. Results that may need to be stored in a temporary or volatile memory, such as RAM, may also be included in memory 1035, and may include any intermediate result similar to what may be stored in storage device 1025. Input device 1015 may be configured to receive wireless signals from satellites and/or base stations according to the present disclosures described herein. Output device 1020 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

The techniques described herein may be used for mobile device or client access to various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, IS-856 and High Rate Packet Data (HRPD) standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA is part of Universal Mobile Telecommunication System (UMTS). Long Term Evolution (LTE) is a radio access technology used by E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). IEEE 802.11 networks are also known as WiFi networks or wireless local area networks (WLANs) and are defined in a family of standards from the Institute of Electrical and Electronics Engineers (IEEE). These various radio technologies and standards are known in the art.

Various examples have been described. These and other examples are within the scope of the following claims.

What is claimed is:

1. A method of providing a combined barometric value by a serving fixed local transceiver, the method comprising:
   obtaining, at the serving fixed local transceiver, barometric values of a plurality of barometric pressure sensor-enabled client fixed local transceivers;
   determining the combined barometric value;
   setting a barometric correction value of the serving fixed local transceiver to the combined barometric value;
   receiving a request for the barometric correction value from a client fixed local transceiver not having a barometric pressure sensor; and
   in response to receiving the request for the barometric correction value, sending an indication of the barometric correction value to the plurality of client fixed local transceivers and to the client fixed local transceiver not having a barometric pressure sensor.

2. The method of claim 1, further comprising:
obtaining altitude values corresponding to locations of the plurality of client fixed local transceivers;
determining a combined altitude value; and
sending the combined altitude value from the serving fixed local transceiver to the client fixed local transceiver not having a barometric pressure sensor.

3. The method of claim 2, wherein the combined altitude value is determined by combining barometric values from the plurality of client fixed local transceivers.

4. The method of claim 3, wherein determining the combined barometric value comprises discarding outlier barometric values.

5. The method of claim 3, wherein determining the combined barometric value comprises averaging the barometric values from the plurality of client fixed local transceivers.

6. The method of claim 3, wherein determining the combined barometric value comprises determining a median of the barometric values from the plurality of client fixed local transceivers.

7. A serving fixed local transceiver for providing a combined barometric value, the serving fixed local transceiver comprising:
a receiver configured to receive a request for a barometric correction value from a client fixed local transceiver not having a barometric pressure sensor; and
a processor configured to:
obtain barometric values of a plurality of barometric pressure sensor-enabled client fixed local transceivers;
determine the combined barometric value;
set the barometric correction value of the serving fixed local transceiver to the combined barometric value; and
a transmitter configured to, in response to receiving the request for the barometric correction value, send an indication of the barometric correction value to the plurality of client fixed local transceivers and to the client fixed local transceiver not having a barometric pressure sensor.

8. The serving fixed local transceiver of claim 7, wherein: the processor is configured to:
obtain altitude values corresponding to locations of the plurality of client fixed local transceivers; and
determine a combined altitude value; and
the transmitter is configured to send the combined altitude value from the serving fixed local transceiver to the client fixed local transceiver not having a barometric pressure sensor.

9. The serving fixed local transceiver of claim 8, wherein the combined altitude value is determined by combining the barometric values from the plurality of client fixed local transceivers.

10. The serving fixed local transceiver of claim 7, wherein determining the combined barometric correction value comprises discarding outlier barometric values.

11. The serving fixed local transceiver of claim 7, wherein determining the combined barometric correction value comprises averaging the barometric values from the plurality of client fixed local transceivers.

12. The serving fixed local transceiver of claim 7, wherein determining the combined barometric correction value comprises determining a median of the barometric values from the plurality of client fixed local transceivers.

13. A method of correcting a barometric value by a client fixed local transceiver not having a barometric pressure sensor, the method comprising:
sending a request, from the client fixed local transceiver to a server fixed local transceiver, for a barometric correction value, wherein the barometric correction value is based on a combination of barometric values from a plurality of barometric pressure sensor-enabled client fixed local transceivers;
receiving, at the client fixed local transceiver not having a barometric pressure sensor, the barometric correction value; and
sending an indication of the barometric correction value from the client fixed local transceiver to another device.

14. The method of claim 13, further comprising:
sending an altitude value corresponding to a location of the client fixed local transceiver;
receiving a combined altitude value, wherein the combined altitude value is comprised of a combination of altitude values from the plurality of client fixed local transceivers.

15. The method of claim 13, wherein the corrected barometric value is determined to be equal to the combined barometric value.

16. A client fixed local transceiver for correcting a barometric value, the client fixed local transceiver comprising:
a transmitter configured to send a request to a server fixed local transceiver, for a combined barometric value, wherein the combined barometric value is comprised of a combination of barometric values from a plurality of barometric pressure sensor-enabled client fixed local transceivers;
a receiver configured to receive the barometric correction value; and
a processor configured to cause the transmitter to send an indication of the barometric correction value from the client fixed local transceiver to another device.

17. The client fixed local transceiver of claim 16, wherein:
the transmitter is configured to send an altitude value corresponding to a location of the client fixed local transceiver;
the receiver is configured to receive a combined altitude value, wherein the combined altitude value is comprised of a combination of altitude values from the plurality of client fixed local transceivers.

18. The client fixed local transceiver of claim 16, wherein the processor is configured to set the corrected barometric value to be equal to the combined barometric value.

* * * * *